No. 857,858. PATENTED JUNE 25, 1907.
J. W. BARNES, Jr.
WHEEL.
APPLICATION FILED JULY 31, 1905.
2 SHEETS—SHEET 2.
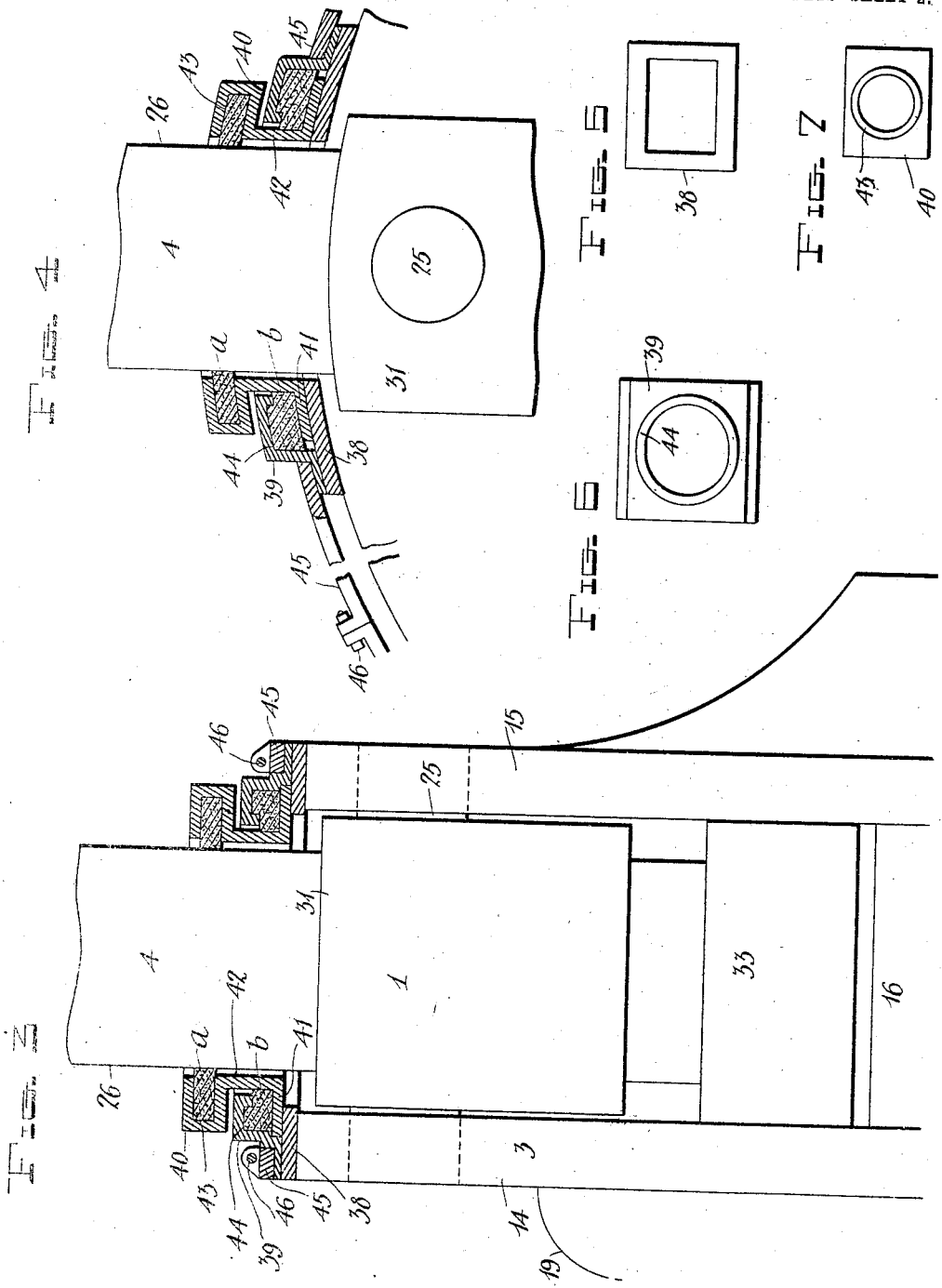
Witnesses
Inventor
J. W. Barnes Jr.
by H. B. Willson & Co
Attorneys

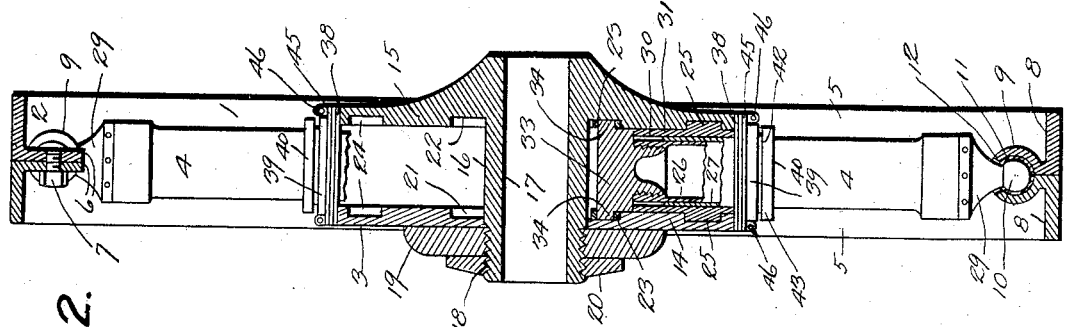

UNITED STATES PATENT OFFICE.

JUSTUS W. BARNES, JR., OF PITTSFIELD, MASSACHUSETTS.

WHEEL.

No. 857,858.   Specification of Letters Patent.   Patented June 25, 1907.

Application filed July 31, 1905. Serial No. 272,086.

*To all whom it may concern:*

Be it known that I, JUSTUS W. BARNES, Jr., a citizen of the United States, residing at Pittsfield, in the county of Berkshire and State of Massachusetts, have invented certain new and useful Improvements in Wheels; and I do declare the following to be a full, clear, and exact description of the invention, such as will enable others skilled in the art to which it appertains to make and use the same.

My invention relates to improvements in elastic vehicle wheels, and consists in the novel construction, combination and arrangement of parts hereinafter described and claimed.

The object of the invention is to provide a simple and durable device of this character which will effectively prevent the jar and shock of rough and uneven roads from being transmitted to the vehicle, so that pneumatic and cushion tires may be dispensed with upon self-propelled and other vehicles.

The above and other objects are attained by means of the construction illustrated in the accompanying drawings, in which,—

Figure 1 is a side elevation of my improved vehicle wheel, the parts being in section to more clearly illustrate the construction; and Fig. 2 is a vertical transverse sectional view through the same. Fig. 3 is a detail transverse sectional view, showing the construction of one of the dust guards; Fig. 4 is a detail longitudinal sectional view, showing one of the dust guards; Fig. 5 is a detail top plan view of one of the base plates; Fig. 6 is a detail top plan view of one of the top plates; and Fig. 7 is a similar view of one of the intermediate plates.

Referring to the drawings by numeral, 1 denotes my improved elastic wheel, which comprises a rim 2 and a hub 3 connected by a plurality of radial spokes 4, which latter are in the form of cushion devices for preventing the jar and vibration of the rim from being imparted to the hub and, hence to the vehicle body. The rim 2, is here shown, as composed of two annular angle metal bands 5, which have their inwardly-projecting flanges 6 bolted together, as at 7, to form a felly, and their other flanges 8 projecting in opposite directions to form the tread or tire of the wheel. At suitable points in the flanges 6 are formed opposing semi-circular sockets 9 for the reception of balls or spheres 10 provided upon the outer ends of the spokes 4. A suitable bushing 11 is provided in each of the sockets 9, and the latter have their openings 12 slightly flared or tapered outwardly to permit the balls or spheres 10 to have a slight movement.

The hub 3 comprises two similar opposing plates or disks 14, 15, the latter of which is formed with an integral concentrically projecting sleeve or tube 16 upon which the other plate or disk 14 is mounted. The bore 17 in the sleeve 16 is adapted to receive the vehicle axle, and the outer end of said sleeve is externally screw-threaded, as at 18, to receive the clamping washer 19 and a locking nut 20 which retains the plate or disk 14 in position. The opposing inner faces of the two plates 14, 15, are formed adjacent to the sleeve 16 with concentrically-disposed depressions or recesses 21, 22, the former of which is circular, and the latter of which is polygonal in form, the number of sides of the polygonal-shaped recess 22 corresponding to the number of spokes in the wheel. These recesses 21, 22, are adapted to receive the friction rollers 23, which are carried by the inner ends of the spokes 4, as presently explained. In the outer portions of the inner faces of the plates or disks 14, 15, are also formed opposing bearing openings 24, which are circular in form so as to receive similarly shaped studs or trunnions 25 provided upon the inner ends of the spokes 4, as shown. Each of the spokes 4 consists of two telescoping tubular members or sections 26, 27, which are elastically or resiliently connected by means of a coil spring 28, which is arranged within the inner member or tube 27. The outer member or tube 26 has its outer end closed by a screw plug 29, upon the reduced outer end of which is formed one of the balls or spheres 10. The open inner end of the outer tube 26 projects into and slides freely in a cylindrical opening 30 formed in a guide and bearing block 31, which is pivotally mounted between the disks 14, 15, of the hub by means of the studs or trunnions 25, which are formed on it at diametrically opposite points. The inner tube 27 of the spoke slides freely within the outer tube 26, and has its outer end partly closed by a head 32. The inner end of said tube 27 is closed by a screw plug 33, which has at its end oppositely projecting studs or trunnions 34, upon which are journaled the rollers 23, which project into the recesses 21, 22, in the plates 14, 15, of the hub. The spring 28 has one of its ends bearing against the head 32 of the inner tube 27 and its opposite end engaging with a washer or ring 35 upon the headed end of a rod or screw 36, which extends through the spring and has its threaded end screwed into the socket in the screw plug 29, a jam nut 37 being provided for keeping it in place.

In order to keep dust and dirt out of the hub of the wheel and keep the grease or other lubricant therein, I provide dust guards upon the periphery of the hub at each of the spokes. Each of these guards comprises a base plate 38, a top plate 39 and an intermediate sliding plate 40, which latter engages the spoke 4, moving with it and between the plates 38, 39, as shown. The base plate 38 is of rectangular form and is engaged with the peripheries or edges of the plates 14, 15, of the hub, a large rectangular opening being provided in it through which the spoke projects.

The intermediate plate 40 has a base portion 41, which slides between the plates 38, 39, a cylindrical portion 42 through which extends the outer tube 26 of the spoke, and an upper annular channel portion 43 of slightly greater diameter than and which surrounds the spoke and is adapted to contain a washer $a$ of felt or other material, to prevent dust from working between said parts and to permit slight angular motion of the spoke in said plate 40.

The upper plate 39 has its inner portion formed with a channel 44 of approximately cylindrical form, adapted to receive a felt washer $b$ which is adapted to keep the dust from between the parts 38 and 40, and the outer portion of the plate 39 is formed with depressions or recesses to receive annular clamping bands 45. The latter surround the hub upon each side and have outer upturned apertured ends clamped together by screw bolts, 46, as shown.

The construction, operation and advantages of the invention will be readily understood.

It will be seen that the load upon the hub will be elastically supported from the upper portion of the rim by reason of the connection of the springs 28 between the sliding sections or members of the spokes. This load upon the hub will cause it to drop slightly out of the center of the wheel, thereby compressing the springs and also deflecting the spokes from the rim to the center of the hub by reason of the action of the guide blocks 31, which serve as pivots, causing the inner ends of the spokes to follow the cams formed by the polygonal faces of the recess 22, and thereby distributing the stress among the several springs. It will be seen that these cams cause the springs to pull the hub into a central position, the inner ends of the spokes being free to move in either direction at right angles to the bore of the hub.

Various changes in the form, proportion and the minor details of construction may be resorted to without departing from the principles or sacrificing any of the advantages of this invention.

Having thus described my invention, what I claim as new, and desire to secure by Letters-Patent, is:

1. A wheel comprising a rim, a hub, a plurality of radial spokes having their ends pivotally connected to said rim and to said hub, each of said spokes consisting of elastically-connected slidable members connected by a spring, and means for distributing the stress among the several springs.

2. A wheel comprising a rim having sockets therein, a hub having a cam, spoke guides, spokes consisting of elastically-connected sliding members, one member of each of said spokes being pivoted in said rim sockets, and one member of each of said spokes being engaged with the cam upon said hub.

3. A wheel comprising a rim having sockets arranged at suitable points, a hub consisting of spaced plates, spoke guide blocks pivotally mounted between said plates, spokes consisting of slidable members, one of said members being slidable in one of said guide blocks and pivotally mounted in one of said rim sockets, the other of said members being engaged with said cam, and a spring connecting said members.

4. A wheel comprising a rim having sockets thereon, a hub consisting of spaced plates, a cam upon said hub, spoke guide blocks pivotally mounted between said plates, spokes consisting of inner and outer telescoping tubular members, said outer members being slidable in said guide blocks and having their outer ends pivotally mounted in said rim sockets, friction rollers upon the inner ends of said inner members and adapted to engage said cam, and coil springs for elastically connecting said members, substantially as described.

5. A wheel comprising a rim consisting of two opposing angle metal sections having sockets formed therein at suitable points, a hub consisting of two plates, one being formed with a sleeve to project through the other, means for securing the latter upon said sleeve, said plates being formed on their inner faces with concentrically arranged recesses and with pivot recesses, apertured spoke guide blocks disposed between said plates and formed with trunnions to enter said pivot recesses, spokes consisting of inner and outer telescoping tubular members, said outer members having their inner ends slidable in the apertures in said guide blocks, balls provided upon the outer ends of said outer members and pivotally mounted in the sockets in said rim, trunnions upon the inner ends of said inner members, friction rollers upon said trunnions and engaging with said concentrically-arranged recesses in said plates, guide rods extending into said inner members and secured to said outer members, and coil springs upon said rods for elastically connecting said members, substantially as described.

6. In a wheel, the combination with a rim, a hub and a movable spoke, of a dust guard comprising base and top plates clamped upon said hub, and an intermediate plate surrounding said spoke and slidable between said base and top plates, substantially as described.

7. In a wheel, the combination with a rim, a hub and movable spoke connecting the same, of dust guards comprising apertured base plates engaging with the periphery of said hub, top plates upon said base plates and formed with annular grooves to receive a packing, and an intermediate plate slidable between said base and top plate and having portions to engage said spokes, and annular grooves to receive packing washers, and clamping bands for securing said plates upon said hub, substantially as described.

In testimony whereof I have hereunto set my hand in presence of two subscribing witnesses.

JUSTUS W. BARNES, Jr.

Witnesses:
GEORGE E. HAYNES,
CHAS. L. JOHNSON.